(12) United States Patent
Shen et al.

(10) Patent No.: US 11,451,135 B2
(45) Date of Patent: Sep. 20, 2022

(54) MULTILEVEL PORT UNDER-VOLTAGE PROTECTION CIRCUIT WITH FLYING CAPACITOR

(71) Applicant: Delta Electronics (Shanghai) Co., Ltd., Shanghai (CN)

(72) Inventors: Guoqiao Shen, Shanghai (CN); Tengshen Zhang, Shanghai (CN); Luping Cao, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 3 days.

(21) Appl. No.: 17/158,017

(22) Filed: Jan. 26, 2021

(65) Prior Publication Data

US 2021/0336530 A1 Oct. 28, 2021

(30) Foreign Application Priority Data

Apr. 23, 2020 (CN) .......................... 202010328585.5

(51) Int. Cl.
*H02M 1/32* (2007.01)
*H02M 3/158* (2006.01)

(52) U.S. Cl.
CPC ........... *H02M 1/32* (2013.01); *H02M 3/1582* (2013.01)

(58) Field of Classification Search
CPC .............................. H02M 1/32; H02M 3/1582
See application file for complete search history.

(56) References Cited

U.S. PATENT DOCUMENTS

| 8,817,440 | B2 | 8/2014 | Dommaschk et al. |
| 2013/0343103 | A1 | 12/2013 | Takizawa |
| 2014/0211520 | A1* | 7/2014 | Zhang .................. H02M 1/126 363/37 |
| 2015/0249403 | A1 | 9/2015 | Sato et al. |
| 2018/0026528 | A1* | 1/2018 | Xiong .................... H02M 3/07 323/312 |
| 2019/0149064 | A1 | 5/2019 | Lefevre |

(Continued)

FOREIGN PATENT DOCUMENTS

| CN | 103312202 A | 9/2013 |
| CN | 102918769 B | 2/2016 |
| CN | 109412439 A | 3/2019 |

(Continued)

*Primary Examiner* — Rafael O De Leon Domenech
(74) *Attorney, Agent, or Firm* — CKC & Partners Co., LLC

(57) ABSTRACT

The disclosure provides a multilevel port under-voltage protection circuit with flying capacitor, comprising: a first circuit unit having first to fourth power switches sequentially connected in series, wherein the first circuit unit is arranged a positive terminal and a negative terminal of a DC input port and each of the switches can tolerate a reverse current; a first flying capacitor having a first terminal connected to the common node of the first power switch and the second power switch in series, and a second terminal connected to the common node of the third power switch and the fourth power switch in series; and a first shunt element connected in antiparallel to the first power switch or the fourth power switch, wherein a pulse peak current tolerated by the first shunt element is greater than the reverse current tolerated by the first power switch or the fourth power switch.

16 Claims, 7 Drawing Sheets

(56) References Cited

U.S. PATENT DOCUMENTS

2021/0067042 A1* 3/2021 Liu .................... H02M 3/1584

FOREIGN PATENT DOCUMENTS

| | | |
|---|---|---|
| CN | 109617148 A | 4/2019 |
| CN | 110277923 A | 9/2019 |
| JP | 2019176639 A | 10/2019 |
| WO | 2013135057 A1 | 9/2013 |
| WO | 2017049924 A1 | 3/2017 |
| WO | 2018045936 A1 | 3/2018 |
| WO | WO-2020263288 A1 * 12/2020 .............. H02M 1/32 |

* cited by examiner

MULTILEVEL PORT UNDER-VOLTAGE PROTECTION CIRCUIT WITH FLYING CAPACITOR

CROSS-REFERENCE TO RELATED APPLICATIONS

This non-provisional application claims priority under 35 U.S.C. § 119(a) on Patent Application No. 202010328585.5 filed in P.R. China on Apr. 23, 2020, the entire contents of which are incorporated herein by reference.

FIELD

The disclosure relates to the field of multilevel converters, and particularly to a multilevel port under-voltage protection circuit with flying capacitor.

BACKGROUND

The multilevel converters have a broad application prospect, and are applied to, for example, the fields of rail traffic, electricity, new energy power generation, energy storage system, high power drive, and the like. Port under-voltage protection capability is an important performance of the multilevel converters which plays an important role in improving product performance, reducing cost and improving operational reliability.

For example, in a three-level converter with flying capacitor, port under-voltage causes high current surge to the power switches in a bridge arm which can damage the power switches. FIG. 1 is a schematic diagram of three-level Buck/Boost circuit with flying capacitor in the prior art. As shown in FIG. 1, when the converter operates normally, the voltage of the flying capacitor C1 is half of the voltage of a port capacitor C2. If port under-voltage occurs, an overcurrent fault will be detected by the control circuit and the power switches Q1 to Q8 are rapidly turned off. FIG. 2 is a schematic diagram of a discharge path of the flying capacitor in one bridge arm of FIG. 1 when port under-voltage occurs. As shown in FIG. 2, when port under-voltage occurs, C2 discharges before C1. When the voltage on C2 drops to approximately to the voltage on C1, C1 starts to discharge. The discharge loop of C1 is from a positive electrode of C1, then passes a body diode of the power switch Q1, a short-circuit fault point, a body diode of the power switch Q4, and finally returns to a negative electrode of C1. FIG. 3 illustrates an equivalent circuit when the flying capacitor in FIG. 2 discharges. The larger the voltage of the flying capacitor C1 is, the larger an instantaneous current flowing through the body diode will be when port under-voltage occurs. However, instantaneous current capacity of the body diode of the power switches Q1 and Q4 is limited. When the instantaneous current flowing through the body diode exceeds the instantaneous current capacity, the body diode of the power switches Q1 and Q4 will be damaged due to an overcurrent.

In order to avoid the Q1 and Q4 from being damaged when port under-voltage occurs, there are two solutions in the prior art. FIG. 4 illustrates a schematic diagram of a port under-voltage protection system in the prior art. FIG. 5 illustrates a schematic diagram of another port under-voltage protection system in the prior art. As shown in FIG. 4, in the first solution, a bus current is detected by a sensor, and when a short-circuit fault is detected, the power switch Q5 on the bus is controlled by a controller to turn off, thereby cutting off the short-circuit current loop. As shown in FIG. 5, in the second solution, the bus current is detected by the sensor, and when the short-circuit fault is detected, the power switch Q5 is controlled by the controller to turn on, thereby forming a discharge circuit of the flying capacitor C1. The discharge circuit of the flying capacitor C1 comprises the flying capacitor C1, the power switch Q5 and a resistor R, wherein the power switch Q5 and a resistor R are connected in series and then connected in parallel to the flying capacitor C1. Before the voltage of C2 drops to the voltage of C1, energy of C1 has been released, and no short-circuit current flows through the body diode of the power switches Q1 and Q4.

However, the two solutions are complicated, and both of the solutions require a detection circuit, a controller and a controllable power device, which occupy too much PCB area and increase cost.

Therefore, it is necessary to find a simple and low-cost multilevel port under-voltage protection circuit with flying capacitor.

Some references, if any, which may include patents, patent applications and various publications, may be cited and discussed in the description of this disclosure. The citation and/or discussion of such references, if any, is provided merely to clarify the description of the present disclosure and is not an admission that any such reference is "prior art" to the disclosure described herein. All references listed, cited and/or discussed in this specification are incorporated herein by reference in their entireties and to the same extent as if each reference was individually incorporated by reference.

SUMMARY

An object of the disclosure is to provide a multilevel port under-voltage protection circuit with flying capacitor, which can realize port under-voltage protection without a detection circuit, a controller or a controllable power device, thereby simplifying product structure, decreasing an occupied area of the PCB, and reducing cost.

To realize the above object, the disclosure provides a multilevel port under-voltage protection circuit with flying capacitor, comprising:
  a first circuit unit comprising, having a first power switch, a second power switch, a third power switch and a fourth power switch sequentially connected in series, wherein the first circuit unit is arranged between a positive terminal and a negative terminal of a DC input port, and each of the first power switch, the second power switch, the third power switch and the fourth power switch can tolerate a reverse current;
  a first flying capacitor having a first terminal and a second terminal, wherein the first terminal of the first flying capacitor is electrically coupled to the common node of the first power switch and the second power switch in series, and the second terminal of the first flying capacitor is electrically coupled to the common node of the third power switch and the fourth power switch in series; and
  a first shunt element connected in antiparallel to the first power switch or the fourth power switch, wherein a pulse peak current tolerated by the first shunt element is greater than the reverse current tolerated by the first power switch or the fourth power switch.

The disclosure further provides a bidirectional multilevel port under-voltage protection circuit with flying capacitor, comprising an inductor element, a first multilevel port under-voltage protection circuit with flying capacitor and a second multilevel port under-voltage protection circuit with second flying capacitor described above, wherein the first multilevel port under-voltage protection circuit with flying capacitor is coupled to second the multilevel port under-voltage protection circuit with flying capacitor via the inductor element.

The disclosure further provides a multiphase multilevel port under-voltage protection circuit with flying capacitor, comprising a plurality of inductor elements and a plurality of multilevel port under-voltage protection circuits with flying capacitor described above, wherein a connection node of a second power switch and a third power switch of each of the multilevel port under-voltage protection circuits with flying capacitor is connected to one end of an output port via the corresponding inductor element.

In the disclosure, by providing a shunt element connected in antiparallel to the power switch to share an impulse current caused by a short circuit with the flying capacitor, a diode or a body diode connected in antiparallel to the power switch is not broken down, thereby protecting the power switch. The multilevel port under-voltage protection circuit with flying capacitor can realize port under-voltage protection without a detection circuit, a controller or a controllable power device, thereby simplifying product structure, decreasing an occupied area of the PCB and reducing cost.

Hereinafter the disclosure is described in detail with reference to the embodiments, and further explanations are provided to the technical solution of the disclosure.

BRIEF DESCRIPTION OF THE DRAWINGS

To enable the above and other objects, features, advantages and examples of the disclosure to become more apparent, the accompanying drawings are explained as follows.

DETAILED DESCRIPTION

Figure 1:
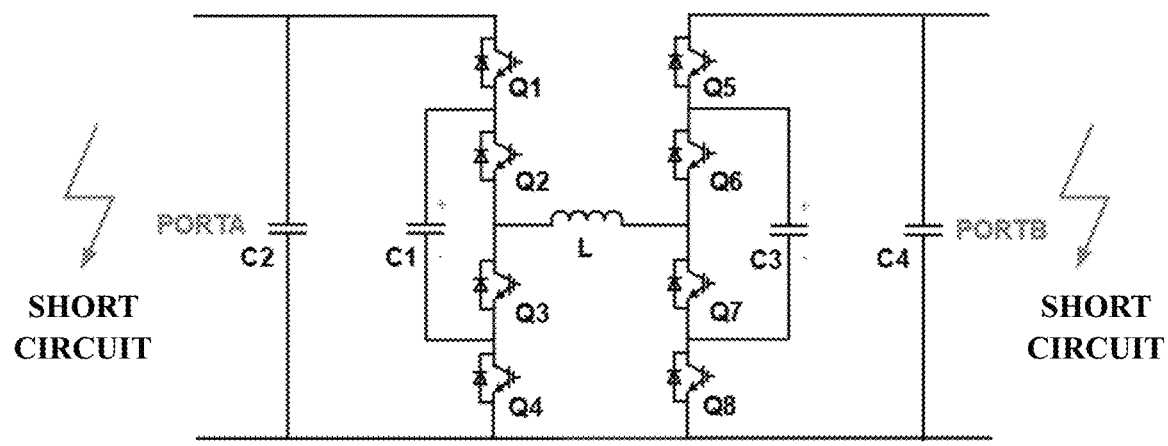
FIG. 1 is a schematic diagram of three-level Buck/Boost circuit with flying capacitor in the prior art.
Figure 2:
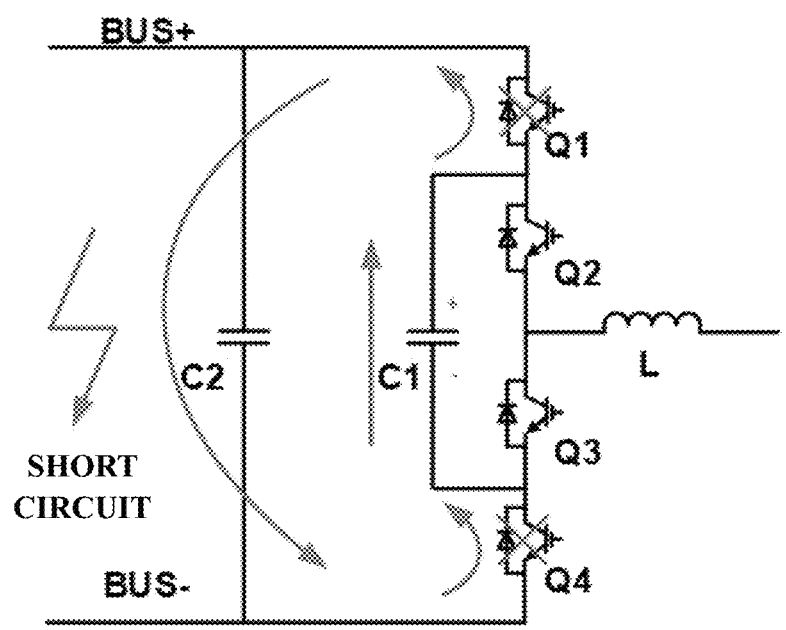
FIG. 2 is a schematic diagram of a discharge path of the flying capacitor in one bridge arm of FIG. 1 when port under-voltage occurs.
Figure 3:
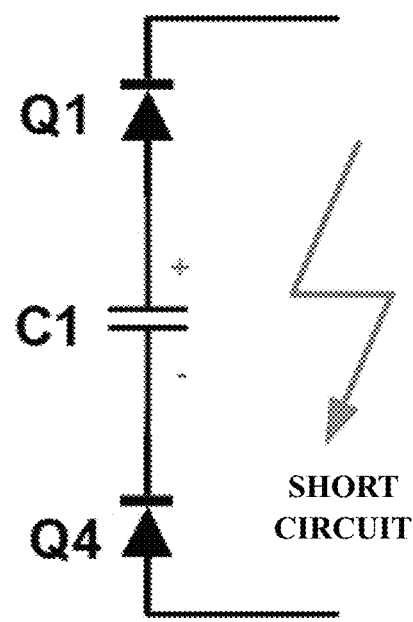
FIG. 3 illustrates a diagram of an equivalent circuit when the flying capacitor in FIG. 2 discharges.
Figure 4:
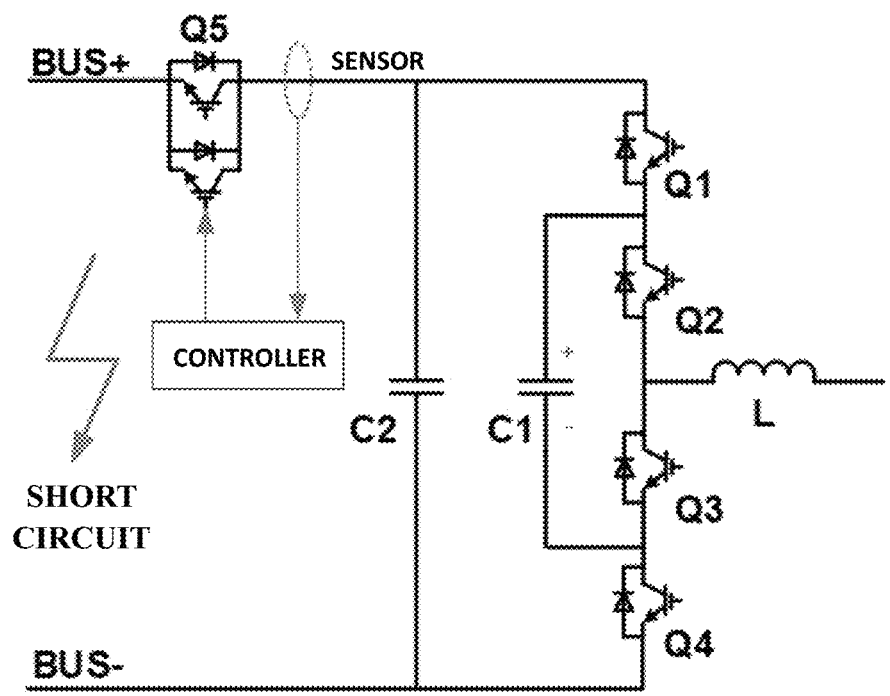
FIG. 4 illustrates a schematic diagram of a port under-voltage protection system in the prior art.
Figure 5:
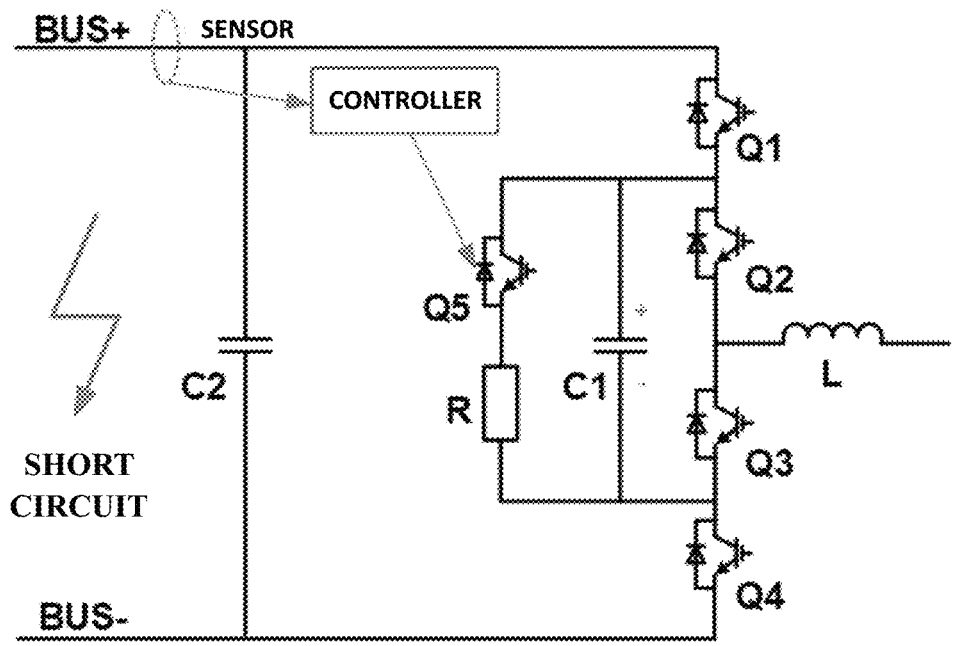
FIG. 5 illustrates a schematic diagram of another port under-voltage protection system in the prior art.

To make description of the disclosure more thorough and complete, reference can be made to the accompanying drawings and various embodiments, and the same number in the drawings represents the same or similar component. On the other hand, the commonly known components and steps are not described in the embodiments to avoid unnecessary limitation to the disclosure. In addition, to simplify the drawings, some known common structures and elements are illustrated in a simple way in the drawings.

Figure 6:
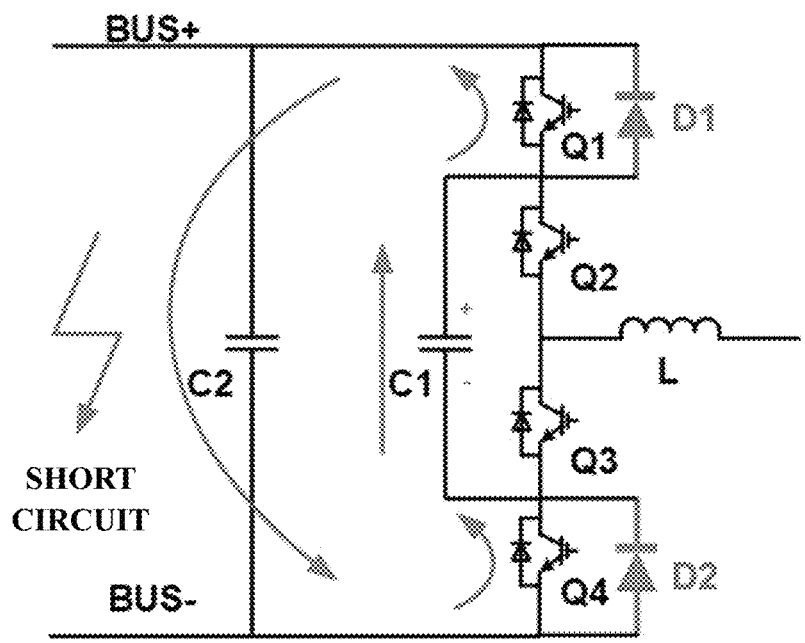
FIG. 6 illustrates a structural diagram of a multilevel port under-voltage protection circuit with flying capacitor according to one preferable embodiment of the disclosure.

As shown in FIG. 6, it illustrates a structural diagram of a multilevel port under-voltage protection circuit with flying capacitor according to one preferable embodiment of the disclosure. The multilevel port under-voltage protection circuit with flying capacitor is connected to a DC input port, such as, between BUS+ and BUS− of the DC input port. The multilevel port under-voltage protection circuit with flying capacitor may comprise: a first circuit unit having a first power switch Q1, a second power switch Q2, a third power switch Q3 and a fourth power switch Q4 sequentially connected in series, wherein the first circuit unit is arranged between a positive terminal BUS+ and a negative BUS− of the DC input port, and each of the first power switch Q1, the second power switch Q2, the third power switch Q3 and the fourth power switch Q4 can tolerate a reverse current; a first flying capacitor C1 having a first terminal and a second terminal, wherein the first terminal of the first flying capacitor C1 is electrically coupled to the common node of the first power switch Q1 and the second power switch Q2 in series, and the second terminal of the first flying capacitor C1 is electrically coupled to the common node of the third power switch Q3 and the fourth power switch Q4 in series; and a first shunt element D1 or D2 connected in antiparallel to the first power switch Q1 or the fourth power switch Q4, wherein a pulse peak current tolerated by the first shunt element D1 or D2 is greater than the reverse current tolerated by the first power switch Q1 or the fourth power switch Q4.

According to one preferable embodiment of the disclosure, as shown in FIG. 6, the multilevel port under-voltage protection circuit with flying capacitor may comprise, for example, the first shunt element D1 and D2. The first shunt element D1 is connected in antiparallel to the first power switch Q1. The first shunt element D2 is connected in antiparallel to the fourth power switch Q4.

According to one preferable embodiment of the disclosure, when a reverse current flows on the first power switch Q1 or the fourth power switch Q4, the reverse current flows through a diode connected in antiparallel to the power switch. Each of the first power switch Q1, the second power switch Q2, the third power switch Q3 and the fourth power switch Q4 may, for example, comprise Si MOSFET or SiC MOSFET. In this case, the diode connected in antiparallel to each of the first power switch Q1, the second power switch Q2, the third power switch Q3 and the fourth power switch Q4 is MOSFET body diode. According to another embodiment of the disclosure, each of the first power switch Q1, the second power switch Q2, the third power switch Q3 and the fourth power switch Q4 may, for example, comprise IGBT device. In this case, the diode connected in antiparallel to each of the first power switch Q1, the second power switch Q2, the third power switch Q3 and the fourth power switch Q4 is antiparallel connected diode built-in the IGBT device. According to another embodiment of the disclosure, each of the first power switch Q1, the second power switch Q2, the third power switch Q3 and the fourth power switch Q4 may, for example, comprise GaN FET device. In this case, each of the first power switch Q1, the second power switch Q2, the third power switch Q3 and the fourth power switch Q4 does not have body diode, but still has certain reverse current capacity.

By providing the first shunt element D1 or D4 connected in antiparallel to the first power switch Q1 or the fourth power switch Q4, when a large reverse impulse current flows through the first power switch Q1 and the fourth power switch Q4 due to port under-voltage of the converter, the first shunt element D1 or D4 can share at least a part of the impulse current to avoid the first power switch Q1 and the fourth power switch Q4 from being damaged.

According to one preferable embodiment of the disclosure, the first shunt element D1 (or D2) may, for example, comprise a diode (such as a Si diode or a SiC diode). As shown in FIG. 6, each of the first power switch Q1, the second power switch Q2, the third power switch Q3 and the fourth power switch Q4 has a gate terminal, a first terminal and a second terminal, and a cathode of the first shunt element D1 (or D2) is connected to the first terminal of the first power switch Q1 (or the fourth power switch Q4). An anode of the first shunt element D1 (or D2) is connected to the second terminal of the first power switch Q1 (or the fourth power switch Q4). Specifically, the first terminal of the first power switch Q1 (or the fourth power switch Q4) is a drain or a collector of the first power switch Q1 (or the fourth power switch Q4), and the second terminal of the first power switch Q1 (or the fourth power switch Q4) is a source or an emitter of the first power switch Q1 (or the fourth power switch Q4).

According to one preferable embodiment of the disclosure, the first flying capacitor C1 comprises a plurality of capacitor elements, and the plurality of capacitor elements are arranged in one type of serial connection, parallel connection and hybrid connection consisting of both serial connection and parallel connection. For example, the flying capacitor C1 may comprise multiple groups of capacitor elements connected in parallel, and each group comprises a plurality of capacitor elements connected in series.

Figure 7:
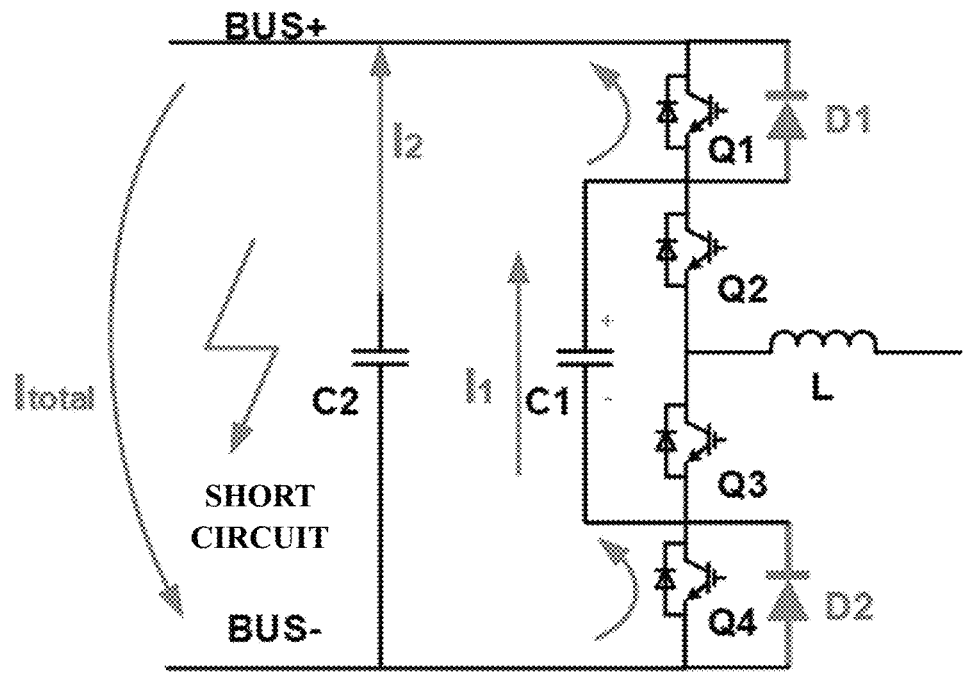
FIG. 7 illustrates a schematic diagram of a current loop of the protection circuit in FIG. 6 when port under-voltage occurs.

According to one preferable embodiment of the disclosure, referring to FIG. 7, assuming that all reverse impulse currents flow through the shunt elements D1 and D2, an impulse current value I1 flowing through the shunt elements can be determined by the following formula:

$$I1 = I_{total} * (C1/(C1+C2))$$

Wherein, I1 is a current value flowing through the flying capacitor C1 (the first shunt elements D1 and D2), and $I_{total}$ is a sum of current values I1 flowing through the flying capacitor C1 and the current values I2 flowing through the port capacitor C2. According to the current value I1, a pulse peak current threshold tolerated by the shunt element D1 (or D2) can be determined.

Figure 8:
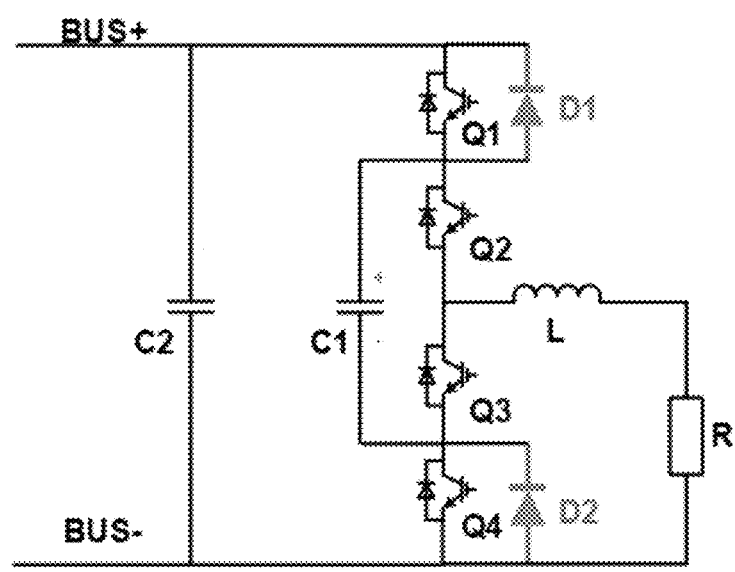
FIG. 8 illustrates a structural diagram of a three-level Buck/Boost converter according to one preferable embodiment of the disclosure.

According to one preferable embodiment of the disclosure, the multilevel port under-voltage protection circuit with flying capacitor may be applied to a DC converter including a multilevel bridge arm with flying capacitor. The DC converter may, for example, comprise a three-level Buck/Boost converter shown in FIG. 8. The three-level Buck/Boost converter comprises: a multilevel port under-voltage protection circuit with flying capacitor, a port capacitor C2 connected between BUS+ and BUS− of the input port, a resistor R, and an inductor L having one end connected to a common node of the second switch Q2 and the third power switch Q3, and another end connected to BUS− of the input port via a load R. Further, the multilevel port under-voltage protection circuit with flying capacitor may comprise: a first circuit unit comprising a first power switch Q1, a second power switch Q2, a third power switch Q3 and a fourth power switch Q4 sequentially connected in series, wherein the first circuit unit is arranged between BUS+ and BUS− of the input port and each of the first power switch Q1 and the fourth power switch Q4 has a diode connected in antiparallel thereto; a first flying capacitor C1 having a first terminal and a second terminal, wherein the first terminal of the first flying capacitor is electrically coupled to the common node of the first power switch Q1 and the second power switch Q2 in series, and the second terminal of the first capacitor is electrically coupled to the common node of the third power switch Q3 and the fourth power switches Q4 in series; and a first shunt element D1 or D2 connected in antiparallel to the first power switch Q1 or the fourth power switch Q4, wherein a pulse peak current tolerated by the first shunt element D1 or D2 is greater than the reverse current tolerated by the first power switch Q1 or the fourth power switch Q4.

According to one preferable embodiment of the disclosure, the multilevel port under-voltage protection circuit with flying capacitor may be applied to a bidirectional DC converter including a multilevel bridge arm with flying capacitor. The DC converter may, for example, comprise bidirectional three-level Buck/Boost converter shown in FIG. 9. The three-level Buck/Boost converter may comprise: a multilevel port under-voltage protection circuit with flying capacitor at PORTA (a first multilevel port under-voltage protection circuit with flying capacitor), a port capacitor C2 connected between BUS+ and BUS− of the input port PORTA, a multilevel port under-voltage protection circuit with flying capacitor at PORTB (a second multilevel port under-voltage protection circuit with flying capacitor), a port capacitor C4 connected between BUS+ and BUS− of the input port PORTB, and an inductor L having one end connected to a connection node of the second power switch Q2 and the third power switch Q3 of the multilevel port under-voltage protection circuit with flying capacitor at PORTA, and another end connected to a connection node of the second power switch Q6 and the third power switches Q7 of the multilevel port under-voltage protection circuit with flying capacitor at PORTB. BUS− of the input port PORTA is connected to BUS− of the input port PORTB.

Further, the multilevel port under-voltage protection circuit with flying capacitor at PORTA (or PORTB) may comprise: a first circuit unit comprising a first power switch Q1, a second power switch Q2, a third power switch Q3 and a fourth power switch Q4 (or a first power switch Q5, a second power switch Q6, a third power switch Q7 and a fourth power switch Q8) sequentially connected in series, wherein the first circuit unit is arranged between BUS+ and BUS− of the input port, and each of the first power switch Q1 (or Q5) and the fourth power switches Q4 (or Q8) has a diode connected in antiparallel thereto; a first flying capacitor C1 (or C3) having a first terminal and a second terminal, wherein the first terminal of the first flying capacitor C1 (or C3) is electrically coupled to the common node of the first power switch Q1 (or Q5) and the second power switch Q2 (Q6) in series, and the second terminal of the first flying capacitor C1 (or C3) is electrically coupled to the common node of the third power switch Q3 (or Q7) and the fourth power switch Q4 (or Q8) in series; and at least one shunt element D1 or D2 (D3 or D4) connected in antiparallel to the first power switch Q1 (or Q5) or the fourth power switch Q4 (or Q8), wherein a pulse peak current tolerated by the shunt first element D1 or D2 (D3 or D4) is greater than the reverse current tolerated by the power the first switch Q1 (or Q5) or the fourth power switch Q4 (or Q8).

Further, the first multilevel port under-voltage protection circuit with flying capacitor and/or the second multilevel port under-voltage protection circuit with flying capacitor may comprise N second circuit units, wherein each of N second circuit units comprises a second flying capacitor, a positive-end power switch and a negative-end power switch, and the positive-end power switch and the negative-end power switch can tolerate a reverse current, respectively, and the second flying capacitor is arranged between a second terminal of the positive-end power switch and a first terminal of the negative-end power switch, wherein the first circuit unit is connected in parallel to the second flying capacitor of the first second circuit unit, and the (N−1)th second circuit unit is connected in parallel to the second flying capacitor of the Nth second circuit unit, and the Nth second circuit unit is connected in parallel to the DC input port, where N is a positive integer.

Figure 10:
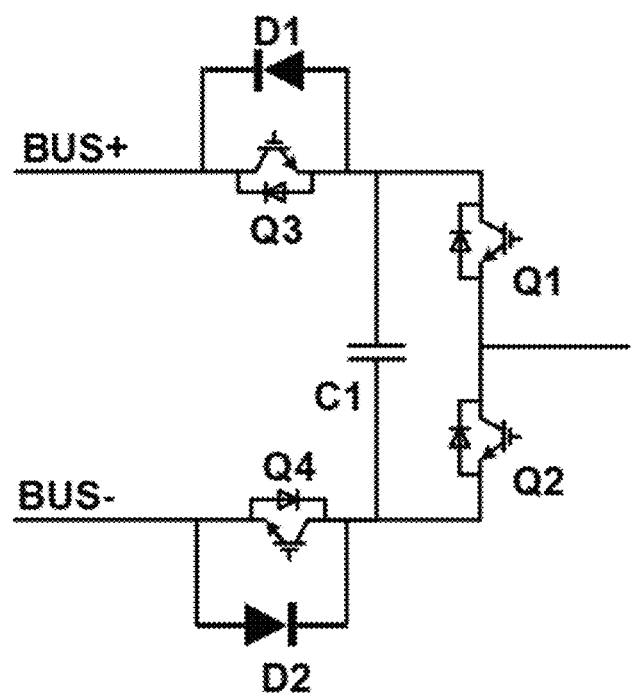
FIG. 10 illustrates a structural diagram of a three-level bridge arm circuit with flying capacitor according to one preferable embodiment of the disclosure.

According to one preferable embodiment of the disclosure, as shown in FIG. 10, the multilevel port under-voltage protection circuit with flying capacitor, for example, may be a three-level circuit with flying capacitor (a three-level bridge arm circuit with flying capacitor), and the structure is similar with the structure of the multilevel port under-voltage protection circuit with flying capacitor shown in FIG. 6. The details will be not described herein.

Figure 11:
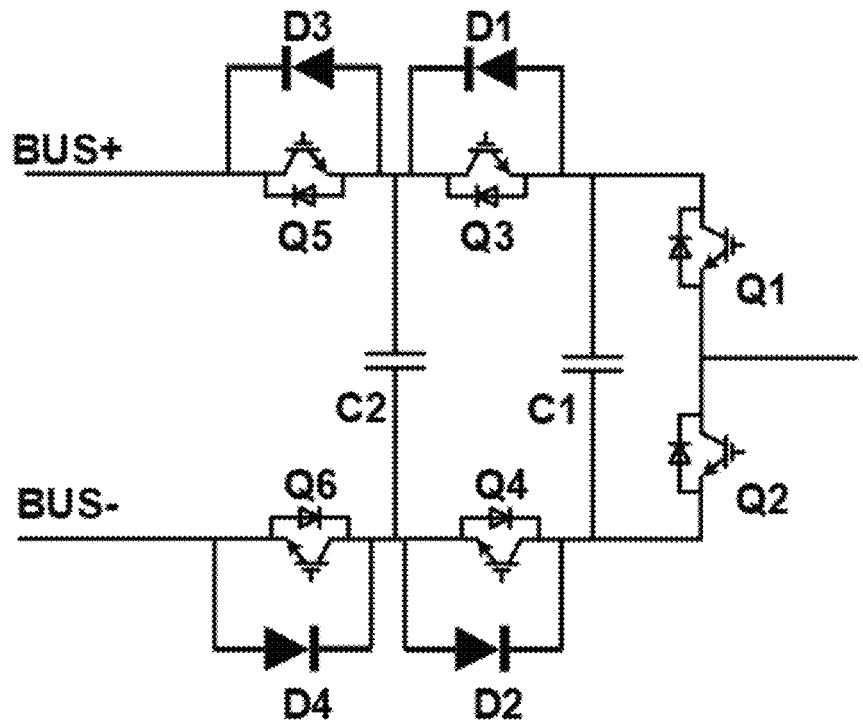
FIG. 11 illustrates a structural diagram of a four-level bridge arm circuit with flying capacitor according to one preferable embodiment of the disclosure.

According to one preferable embodiment of the disclosure, as shown in FIG. 11, the multilevel port under-voltage protection circuit with flying capacitor, for example, may be a four-level circuit with flying capacitor (a four-level bridge arm circuit with flying capacitor). The four-level circuit with flying capacitor is obtained by adding a second circuit unit to the three-level circuit with flying capacitor shown in FIG. 10. The second circuit unit may comprise a second flying capacitor C2, a positive-end power switch Q5 and a negative-end power switch Q6. Each of the positive-end power switch Q5 and the negative-end power switch Q6 has diode connected in antiparallel thereto, respectively. The second flying capacitor C2 is arranged between a second terminal of the positive-end power switch Q5 and a first terminal of the negative-end power switch Q6. The first circuit unit is connected in parallel to the second flying capacitor C2 of the second circuit unit. Further, the first terminal of the positive-end power switch Q5 of the second circuit unit is connected to BUS+ of the input port, and the second terminal of the negative-end power switch Q6 is connected to BUS− of the input port.

Figure 12:
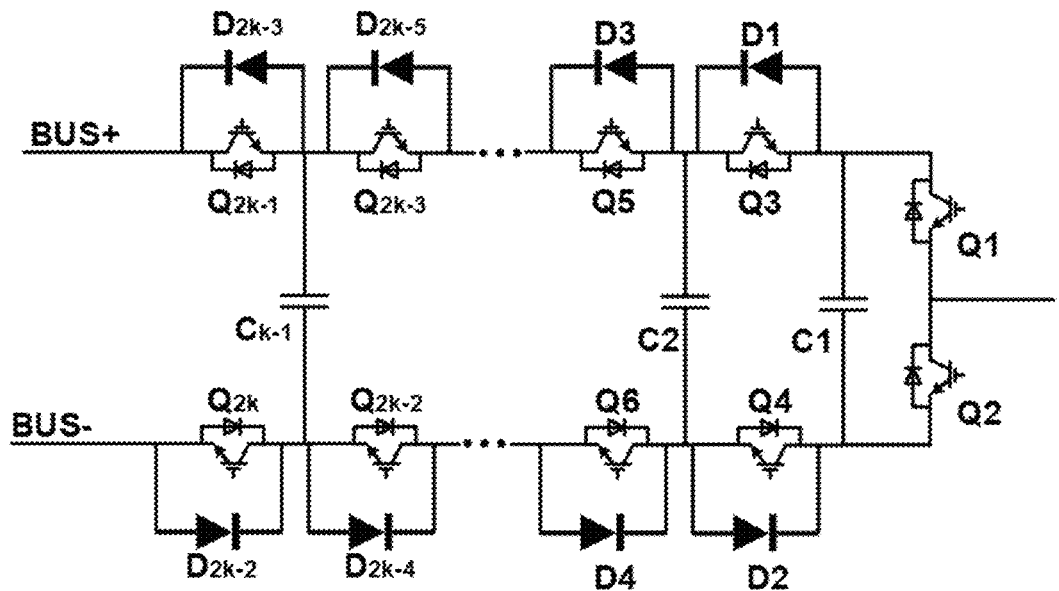
FIG. 12 illustrates a structural diagram of a (k+1)-level bridge arm circuit with flying capacitor according to one preferable embodiment of the disclosure.

According to one preferable embodiment of the disclosure, as shown in FIG. 12, based on the three-level circuit with flying capacitor shown in FIG. 10, the multilevel port under-voltage protection circuit with flying capacitor may further comprise N second circuit units. Each of the N second circuit units may comprise a second flying capacitor, a positive-end power switch and a negative-end power switch. For example, the second circuit unit may comprise a second flying capacitor Ck−1, a positive-end power switch Q2k−1 and a negative-end power switch Q2k. Each of the positive-end power switch Q2k−1 and the negative-end power switch Q2k has diode connected in antiparallel thereto, respectively. The second flying capacitor Ck−1 is connected between a second terminal of the positive-end power switch Q2k−1 and a first terminal of the negative-end power switch Q2k.

Further, a first terminal of the positive-end power switch Q2k−1 is connected to BUS+ of the input port, and a second terminal of the negative-end power switch Q2k is connected to BUS− of the input port.

According to one preferable embodiment of the disclosure, the positive-end power switch Q2k−1 and the negative-end power switch Q2k may, for example, comprise Si MOSFETs or SiC MOSFETs, and the second flying capacitor Ck−1 has one terminal connected to a source of the positive-end power switch Q2k−1, and another terminal connected to a drain of the negative-end power switch Q2k.

According to one preferable embodiment of the disclosure, as shown in FIG. 12, the first circuit unit is connected in parallel to the second flying capacitor C2 of the 1st second circuit unit. The (N−1)th second circuit unit is connected in parallel to the second flying capacitor of the Nth second circuit unit. For example, when N is 1, only the first circuit unit is connected in parallel to the second flying capacitor C2 of the 1st second circuit unit, while no other second circuit unit is connected in parallel to the second flying capacitor C2 of the 1st second circuit unit, as shown in FIG. 11. For example, when N is 2, the 1st second circuit unit is connected in parallel to the second flying capacitor C3 (not shown) of the 2nd second circuit unit, and so on. Further, the Nth second circuit unit is connected in parallel to BUS+ and BUS− of the input port, where N is a positive integer.

According to one preferable embodiment of the disclosure, as shown in FIG. 12, the first circuit unit is connected in parallel to the second flying capacitor C2 of the 1st second circuit unit. The power switches Q3, Q4 of the first circuit unit, the positive-end power switches Q5 and the negative-end power switch Q6 may, for example, comprise Si MOSFETs, SiC MOSFETs, GaN FETs or IGBTs. A drain of the power switch Q3 of the first circuit unit is connected to a source or an emitter of the positive-end power switch Q5, and a source of the power switch Q4 is connected to a drain or a collector of the negative-end power switch Q6.

According to one preferable embodiment of the disclosure, when N is greater than or equals to 2, a first terminal of the positive-end power switch of the (N−1)th second circuit unit is connected to a second terminal of the positive-end power switch of the Nth second circuit unit, and a second terminal of the negative-end power switch of the (N−1)th second circuit unit is connected to a first terminal of the negative-end power switch of the Nth second circuit unit. For example, when N is equal to 2, as shown in FIG. 12, the first terminal of the positive-end power switch Q5 of the 1st second circuit unit is connected to the second terminal of the positive-end power switch Q7 (not shown) of the 2nd second circuit unit, the second terminal of the negative-end power switch Q6 of the 1st second circuit unit is connected to the first terminal of the negative-end power switch Q8 (not shown) of the 2nd second circuit unit, and so on. The first terminal of the positive-end power switch Q2k−3 of the (k−3)th second circuit unit is connected to the second terminal of the positive-end power switch Q2k−1 of the (k−2)th second circuit unit, and the second terminal of the negative-end power switch Q2k−2 of the (k−3)th second circuit unit is connected to the first terminal of the negative-end power switch Q2k of the (k−2)th second circuit unit. As shown in FIG. 12, the multilevel port under-voltage protection circuit with flying capacitor is a (k+1)-level bridge arm circuit with flying capacitor.

According to one preferable embodiment of the disclosure, the positive-end power switch (such as Q5) and the negative-end power switch (such as Q6) of the second circuit unit may comprise Si MOSFETs or SiC MOSFETs, and the diodes connected respectively in antiparallel to the positive-end power switch and the negative-end power switch are MOSFET body diodes.

According to another embodiment of the disclosure, the positive-end power switch (such as Q5) and the negative-end power switch (such as Q6) of the second circuit unit may comprise IGBT devices, and the diodes connected respectively in antiparallel to the positive-end power switch and the negative-end power switch are built-in the IGBT devices.

According to another embodiment of the disclosure, the positive-end power switch (such as Q5) and the negative-end power switch (such as Q6) of the second circuit unit may comprise GaN FET device. In this case, the positive-end power switch (such as Q5) and the negative-end power switch (such as Q6) do not have body diode, but still has a certain reverse current capacity.

According to one preferable embodiment of the disclosure, as shown in FIG. 12, when N is greater than or equal to 2, in the (N−1)th second circuit unit, a drain or a collector (the first terminal) of the positive-end power switch is connected to a source or an emitter (the second terminal) of the positive-end power switch of the Nth second circuit unit, and a source or an emitter (the second terminal) of the negative-end power switch is connected to a drain or a collector (the first terminal) of the negative-end power switch of the Nth second circuit unit.

According to one preferable embodiment of the disclosure, as shown in FIG. 12, the multilevel port under-voltage protection circuit with flying capacitor further comprises a second shunt element D3 or D4 connected in antiparallel to the positive-end power switch Q5 or the negative-end power switch Q6, wherein a pulse peak current tolerated by the shunt element D3 or D4 is greater than the reverse current tolerated by the positive-end power switch Q5 or the negative-end power switch Q6.

According to one preferable embodiment of the disclosure, as shown in FIG. 12, the multilevel port under-voltage protection circuit with flying capacitor may comprise the second shunt element D3 and D4. The second shunt element D3 is connected in antiparallel to the positive-end power switch Q5. The second shunt element D4 is connected in antiparallel to the negative-end power switch Q6.

According to one preferable embodiment of the disclosure, the second shunt element may comprise a diode (such as, a Si diode or a SiC diode). The second flying capacitor Ck−1 may, for example, comprise a plurality of capacitor elements, and the plurality of capacitor elements are arranged in one type of serial connection, parallel connection and hybrid connection consisting of both serial connection and parallel connection.

Figure 13:
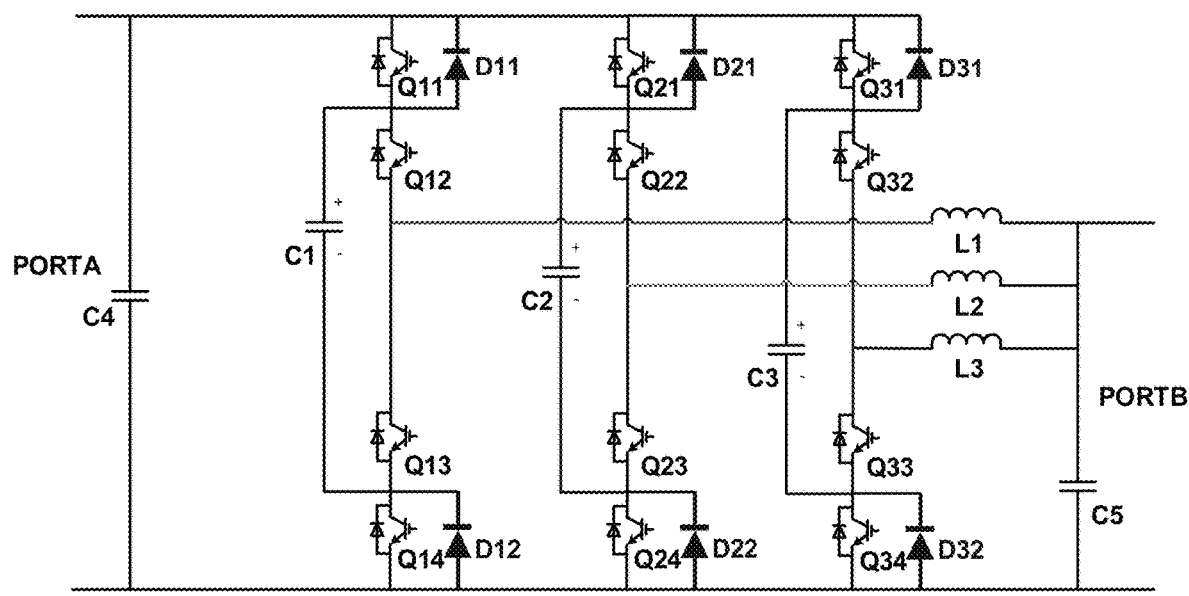
FIG. 13 illustrates a three-phase three-level Buck/Boost converter with flying capacitor according to one preferable embodiment of the disclosure.

According to one preferable embodiment of the disclosure, as shown in FIG. 13, a three-level Buck/Boost converter with flying capacitor also can form a multiphase circuit, such as a three-phase circuit shown in FIG. 13. The multiphase multilevel port under-voltage protection circuit with flying capacitor comprises a plurality of inductor elements and a plurality of multilevel port under-voltage protection circuits with flying capacitor described above. A connection node of a second power switch and a third power switch of each of the multilevel port under-voltage protection circuits with flying capacitor is connected to one end of an output port via the corresponding inductor element. Another end of the output port is connected to a negative electrode of the DC input port. As shown in FIG. 13, an output end of each three-level Buck/Boost converter with flying capacitor can be connected in parallel via the inductor elements L1, L2 or L3 and output power to the load. Further, the multiphase multilevel port under-voltage protection circuit with flying capacitor may comprise an output capacitor C5 connected in parallel to the output port PORTB. Such embodiment facilitates can reduce current-carrying requirement of power device in large power application, reduce cost, and increase the output power of the converter. And the respective phases can be operated alternatively to reduce the output current or voltage ripple.

According to one preferable embodiment of the disclosure, in the multiphase multilevel port under-voltage protection circuit with flying capacitor, one or more multilevel port under-voltage protection circuits with flying capacitor may comprise N second circuit units, wherein each of N second circuit unit comprises a second flying capacitor, a positive-end power switch and a negative-end power switch, and the positive-end power switch and the negative-end power switch can tolerate a reverse current, respectively, and the second flying capacitor is arranged between a second terminal of the positive-end power switch and a first terminal of the negative-end power switch, wherein the first circuit unit is connected in parallel to the second flying capacitor of the first second circuit unit, and the (N−1)th second circuit unit is connected in parallel to the second flying capacitor of the Nth second circuit unit, and the Nth second circuit unit is connected in parallel to the DC input port, where N is a positive integer.

Figure 9:
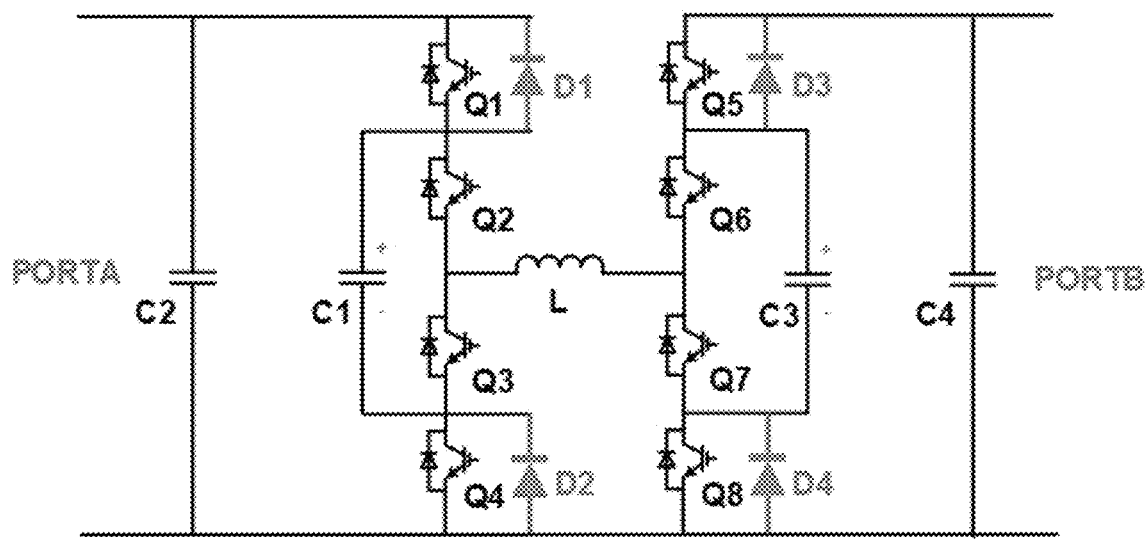
FIG. 9 illustrates a structural diagram of a bidirectional three-level Buck/Boost converter according to one preferable embodiment of the disclosure.

According to another embodiment of the disclosure, multiple groups of bidirectional three-level Buck/Boost converters shown in FIG. 9 also can be connected in parallel to form a multiphase circuit. Specifically, the input port (PORTA) and the output port (PORTB) of each group of bidirectional three-level Buck/Boost converter are connected in parallel. Such embodiment facilitates can reduce current-carrying requirement of power device in large power application, reduce cost, and increase output power of the converter. And the respective phases can be operated alternatively to reduce the output current or voltage ripple.

In the disclosure, by providing shunt element connected in antiparallel to the power switch to share an impulse current caused by a port under-voltage fault, the power switch is not damaged due to an overcurrent, thereby protecting the device. The multilevel port under-voltage protection circuit with flying capacitor can protect the power switch without a detection circuit, a controller or a controllable power device, thereby simplifying product structure, decreasing an occupied area of the PCB, and reducing cost.

Although the disclosure has been disclosed by the embodiments, the disclosure is not limited thereto. Any skilled in the art shall make various changes and modifications without departing from sprit and scope of the disclosure, so the protection scope of the disclosure shall be determined by the scope defined by the appended claims.

What is claimed is:

1. A multilevel port under-voltage protection circuit with flying capacitor, comprising:
   a first circuit unit, having a first power switch, a second power switch, a third power switch and a fourth power switch sequentially connected in series, wherein the first circuit unit is arranged between a positive terminal and a negative terminal of a DC input port, and each of the first power switch, the second power switch, the third power switch and the fourth power switch can tolerate a reverse current;

a first flying capacitor having a first terminal and a second terminal, wherein the first terminal of the first flying capacitor is electrically coupled to the common node of the first power switch and the second power switch in series, and the second terminal of the first flying capacitor is electrically coupled to the common node of the third power switch and the fourth power switch in series;

a first shunt element connected in antiparallel to the first power switch or the fourth power switch, wherein a pulse peak current tolerated by the first shunt element is greater than the reverse current tolerated by the first power switch or the fourth power switch; and N second circuit units, wherein each of N second circuit units comprises:
a positive-end power switch and a negative-end power switch being able to tolerate a reverse current, respectively,
a second flying capacitor arranged between a second terminal of the positive-end power switch and a first terminal of the negative-end power switch, and
a second shunt element connected in antiparallel to the positive-end power switch or the negative-end power switch, a pulse peak current tolerated by the second shunt element is greater than the reverse current tolerated by the positive-end power switch or the negative-end power switch, wherein the first circuit unit is connected in parallel to the second flying capacitor of the 1st second circuit unit, and the (N−1)th second circuit unit is connected in parallel to the second flying capacitor of the Nth second circuit unit, and the Nth second circuit unit is connected in parallel to the DC input port, where N is a positive integer.

2. The circuit according to claim 1, wherein each of the first power switch, the second power switch, the third power switch and the fourth power switch comprises at least one of Si MOSFET, SiC MOSFET, GaN FET or IGBT.

3. The circuit according to claim 1, wherein the first shunt element comprises a diode.

4. The circuit according to claim 3, wherein each of the first power switch, the second power switch, the third power switch and the fourth power switch has a gate terminal, a first terminal and a second terminal, and a cathode of the diode is connected to the first terminal of the first power switch or the fourth power switch, and a anode of the diode is connected to the second terminal of the first power switch or the fourth power switch, Specifically, the first terminal of the first power switch or the fourth power switch is the drain or collector, and the second terminal of the first power switch or the fourth power switch is the source or emitter.

5. The circuit according to claim 1, wherein the first flying capacitor comprises a plurality of capacitor elements, and the plurality of capacitor elements are arranged in one type of serial connection, parallel connection and hybrid connection consisting of both serial connection and parallel connection.

6. The circuit according to claim 1, wherein
when N is greater than or equal to 2, a first terminal of the positive-end power switch in the (N−1)th second circuit unit is connected to the second terminal of the positive-end power switch of the Nth second circuit unit, and a second terminal of the negative-end power switch in the (N−1)th second circuit unit is connected to the first terminal of the negative-end power switch of the Nth second circuit unit.

7. The circuit according to claim 1, wherein each of the positive-end power switch and the negative-end power switch of the second circuit units comprises at least one of Si MOSFET, SiC MOSFET, GaN FET or IGBT.

8. The circuit according to claim 1, wherein the second shunt element comprises a diode.

9. The circuit according to claim 1, wherein the second flying capacitor comprises a plurality of capacitor elements, and the plurality of capacitor elements are arranged in one type of serial connection, parallel connection and hybrid connection consisting of both serial connection and parallel connection.

10. A bidirectional multilevel port under-voltage protection circuit with flying capacitor, comprising:
an inductor;
a first multilevel port under-voltage protection circuit with flying capacitor; and
a second multilevel port under-voltage protection circuit with flying capacitor;
wherein each of the first and second multilevel port under-voltage protection circuit with flying capacitor comprising:
a first circuit unit, having a first power switch, a second power switch, a third power switch and a fourth power switch sequentially connected in series, wherein the first circuit unit is arranged between a positive terminal and a negative terminal of a DC input port, and each of the first power switch, the second power switch, the third power switch and the fourth power switch can tolerate a reverse current;
a first flying capacitor having a first terminal and a second terminal, wherein the first terminal of the first flying capacitor is electrically coupled to the common node of the first power switch and the second power switch in series, and the second terminal of the first flying capacitor is electrically coupled to the common node of the third power switch and the fourth power switch in series; and
a first shunt element connected in antiparallel to the first power switch or the fourth power switch, wherein a pulse peak current tolerated by the first shunt element is greater than the reverse current tolerated by the first power switch or the fourth power switch, and
wherein the first multilevel port under-voltage protection circuit with flying capacitor is coupled to the second multilevel port under-voltage protection circuit with flying capacitor via the inductor element.

11. The bidirectional multilevel port under-voltage protection circuit with flying capacitor according to claim 10, wherein the first multilevel port under-voltage protection circuit with flying capacitor and/or the second multilevel port under-voltage protection circuit with flying capacitor may comprise N second circuit units, wherein each of N second circuit units comprises a second flying capacitor, a positive-end power switch and a negative-end power switch, and the positive-end power switch and the negative-end power switch can tolerate a reverse current, respectively, and the second flying capacitor is arranged between a second terminal of the positive-end power switch and a first terminal of the negative-end power switch,
wherein the first circuit unit is connected in parallel to the second flying capacitor of the 1st second circuit unit, and the (N−1)th second circuit unit is connected in parallel to the second flying capacitor of the Nth second circuit unit, and the Nth second circuit unit is connected in parallel to the DC input port, where N is a positive integer.

12. The bidirectional multilevel port under-voltage protection circuit with flying capacitor according to claim 10, wherein one end of the inductor element is connected to a connection node of a second power switch and a third power switch of the first multilevel port under-voltage protection circuit with flying capacitor, and the other end of the inductor element is connected to a connection node of a second power switch and a third power switch of the second multilevel port under-voltage protection circuit with flying capacitor.

13. A multiphase multilevel port under-voltage protection circuit with flying capacitor, comprising:
   a plurality of inductor elements; and
   a plurality of multilevel port under-voltage protection circuits with flying capacitor;
   wherein each of the plurality of multilevel port under-voltage protection circuit with flying capacitor comprising:
      a first circuit unit, having a first power switch, a second power switch, a third power switch and a fourth power switch sequentially connected in series, wherein the first circuit unit is arranged between a positive terminal and a negative terminal of a DC input port, and each of the first power switch, the second power switch, the third power switch and the fourth power switch can tolerate a reverse current;
      a first flying capacitor having a first terminal and a second terminal, wherein the first terminal of the first flying capacitor is electrically coupled to the common node of the first power switch and the second power switch in series, and the second terminal of the first flying capacitor is electrically coupled to the common node of the third power switch and the fourth power switch in series; and
      a first shunt element connected in antiparallel to the first power switch or the fourth power switch, wherein a pulse peak current tolerated by the first shunt element is greater than the reverse current tolerated by the first power switch or the fourth power switch, and
   wherein a connection node of a second power switch and a third power switch of each of the multilevel port under-voltage protection circuits with flying capacitor is connected to one end of an output port via the corresponding inductor element.

14. The multiphase multilevel port under-voltage protection circuit with flying capacitor according to claim 13, wherein one or more multilevel port under-voltage protection circuit with flying capacitor comprises N second circuit units, wherein each of N second circuit unit comprises a second flying capacitor, a positive-end power switch and a negative-end power switch, and the positive-end power switch and the negative-end power switch can tolerate a reverse current, respectively, and the second flying capacitor is arranged between a second terminal of the positive-end power switch and a first terminal of the negative-end power switch,
   wherein the first circuit unit is connected in parallel to the second flying capacitor of the 1st second circuit unit, and the (N−1)th second circuit unit is connected in parallel to the second flying capacitor of the Nth second circuit unit, and the Nth second circuit unit is connected in parallel to the DC input port, where N is a positive integer.

15. The multiphase multilevel port under-voltage protection circuit with flying capacitor according to claim 13, further comprising an output capacitor connected in parallel to the output port.

16. The multiphase multilevel port under-voltage protection circuit with flying capacitor according to claim 13, wherein another end of the output port is connected to a negative electrode of the DC input port.

* * * * *